(12) United States Patent
Bagheri et al.

(10) Patent No.: US 11,641,646 B2
(45) Date of Patent: *May 2, 2023

(54) METHOD AND APPARATUS FOR RECEIVING A TRANSPORT BLOCK IN A TRANSMISSION OCCASION

(71) Applicant: Lenovo (Singapore) Pte. Ltd., New Tech Park (SG)

(72) Inventors: Hossein Bagheri, Urbana, IL (US); Hyejung Jung, Northbrook, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,311

(22) Filed: Oct. 16, 2021

(65) Prior Publication Data
US 2022/0039128 A1 Feb. 3, 2022

Related U.S. Application Data

(63) Continuation of application No. 16/671,095, filed on Oct. 31, 2019, now Pat. No. 11,184,907.

(60) Provisional application No. 62/754,513, filed on Nov. 1, 2018.

(51) Int. Cl.
*H04W 72/12* (2009.01)
*H04W 72/14* (2009.01)
*H04W 72/1268* (2023.01)

(52) U.S. Cl.
CPC ....... *H04W 72/1268* (2013.01); *H04W 72/14* (2013.01)

(58) Field of Classification Search
CPC ..... H04W 72/00; H04W 72/12; H04W 72/14; H04W 72/1263; H04W 72/1268; H04W 72/1278; H04W 72/1289
See application file for complete search history.

(56) References Cited

U.S. PATENT DOCUMENTS

| | | | |
|---|---|---|---|
| 10,863,538 B2* | 12/2020 | Sundararajan | H04L 1/1657 |
| 2019/0097762 A1* | 3/2019 | Jeon | H04L 1/1864 |
| 2019/0230691 A1* | 7/2019 | Cao | H04L 5/0042 |
| 2020/0044793 A1* | 2/2020 | Sundararajan | H04L 5/0082 |
| 2020/0052828 A1* | 2/2020 | Wang | H04W 72/0446 |
| 2020/0059322 A1* | 2/2020 | Lei | H04L 1/1671 |
| 2020/0099477 A1* | 3/2020 | Al-Imari | H04W 72/1268 |

(Continued)

*Primary Examiner* — Robert C Scheibel
(74) *Attorney, Agent, or Firm* — Loppnow & Chapa; Matthew C. Loppnow

(57) ABSTRACT

A configured-grant configuration can be transmitted. The configured-grant configuration can configure periodic plurality of UL repetition bundles, each UL repetition bundle including a number of PUSCH repetitions. The periodic plurality of UL repetition bundles can include a plurality of transmission occasions. A first TB can be received in UL resources corresponding to at least a portion of an UL repetition bundle of the periodic plurality of UL repetition bundles. An indication can be determined and transmitted. A second TB can be received in a transmission occasion. The second TB can include different data from the first TB. The transmission occasion can be determined based on the indication and among the plurality of transmission occasions of the periodic plurality of uplink repetition bundles.

16 Claims, 7 Drawing Sheets

(56) References Cited

U.S. PATENT DOCUMENTS

2020/0177326 A1\* 6/2020 Jechoux ................ H04L 1/1819
2020/0195407 A1\* 6/2020 Du ........................ H04L 1/1893

\* cited by examiner

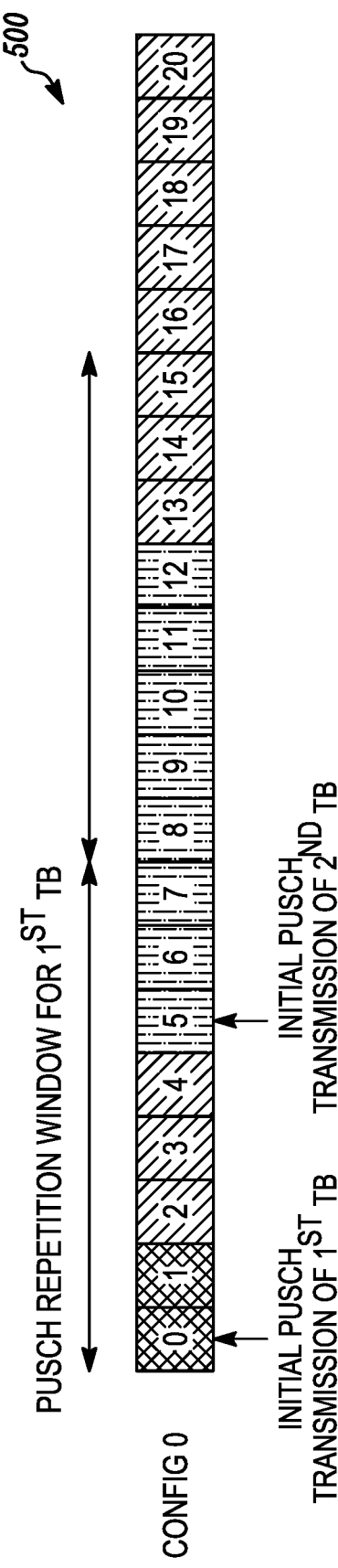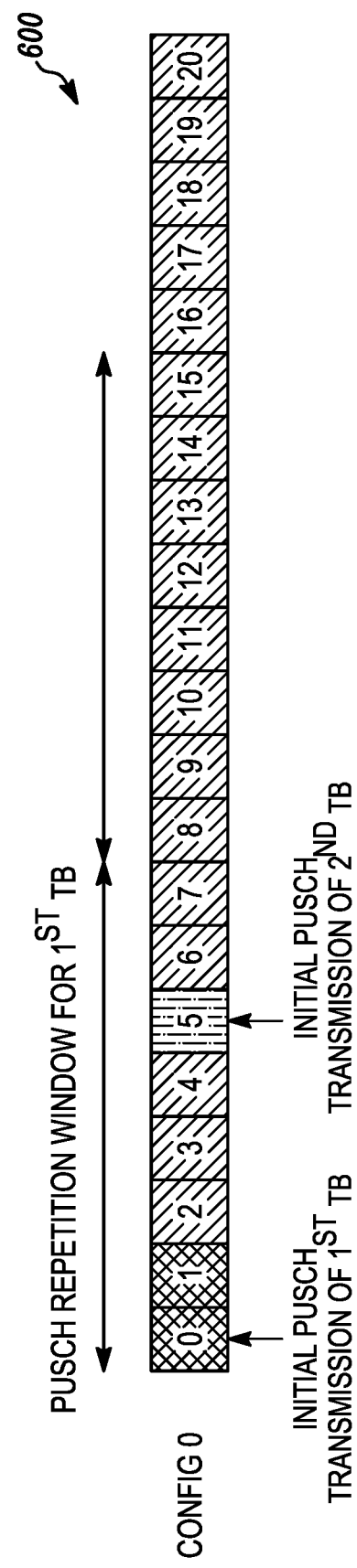

METHOD AND APPARATUS FOR RECEIVING A TRANSPORT BLOCK IN A TRANSMISSION OCCASION

BACKGROUND

1. Field

The present disclosure is directed to a method and apparatus for receiving a transport block in a transmission occasion. More particularly, the present disclosure is directed to receiving a first transport block in uplink resources corresponding to a repetition bundle and receiving a second transport block in a transmission occasion.

2. Introduction

Presently, wireless communication devices, such as User Equipment (UE), communicate with other communication devices using wireless signals. A UE can be configured to receive in Downlink (DL) operation or transmit in Uplink (UL) operation in determined time instances according to higher layer configured parameters, such as periodicity of data transmissions parameters. In DL, semi-persistent scheduling can be activated/deactivated via a Physical Downlink Control Channel (PDCCH) associated with Configured Scheduling (CS)-Radio Network Temporary Identifier (RNTI). Upon reception of the activation command, the UE starts receiving DL data, such as Physical Downlink Shared Channel (PDSCH) transmissions in time-periodic time-frequency resources indicated via activation Downlink Control Information (DCI). A Hybrid Automatic Repeat Request (HARD) process number is determined from the time PDSCH starts according to a formula.

In the UL direction, there are two types of UL transmissions without a dynamic grant: Type I, and Type II. Type II is very similar to Semi-Persistent Scheduling (SPS) operation in DL. However, type I uses Radio Resource Control (RRC)-based UL grant, such as with no activation DCI.

UL Configured Grant (CG) operation aims at reducing the latency, as a Scheduling Request (SR) procedure is bypassed, and reducing overhead, as DCI is not sent for each transmission occasion. To increase the reliability of CG operation, the UE can be configured to repeat the transmission repK, such as, for example, repK=1, 2, 4, or 8, times. According to Third Generation Partnership Project (3GPP) Technical Specification (TS) 38.214 Rel-15, when the UE is configured with repK>1, the UE shall repeat a Transport Block (TB) across the repK consecutive slots applying the same symbol allocation in each slot.

According to TS 38.321 Rel-15, section 5.4.1, for each serving cell and each configured uplink grant, if configured and activated, the Medium Access Control (MAC) entity shall:

1> if the Physical Uplink Shared Channel (PUSCH) duration of the configured uplink grant does not overlap with the PUSCH duration of an uplink grant received on the PDCCH for this serving sell:
2> set the HARQ Process Identifier (ID) to the HARQ Process ID associated with this PUSCH duration;
2> if the configuredGrantTimer for the corresponding HARQ process is not running:
3> consider the New Data Indicator NDI bit for the corresponding HARQ process to have been toggled;
3> deliver the configured uplink grant and the associated HARQ information to the HARQ entity.

The configuredGrantTimer can take values from 1 to 64 in number of periodicities as provided in the IE ConfiguredGrantConfig.

According to TS 38.321, for configured uplink grants, the HARQ Process ID associated with the first symbol of a UL transmission is derived from the following equation:

HARQ Process ID=[floor(CURRENT_symbol/periodicity)] modulo nrofHARQ-Processes where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211. CURRENT_symbol refers to the symbol index of the first transmission occasion of a repetition bundle that takes place.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIG. 5 is an example illustration of PUSCH transmissions according to a possible embodiment;

FIG. 6 is an example illustration of a transmission occasion within a first repetition bundle according to a possible embodiment;

DETAILED DESCRIPTION

Embodiments provide a method and apparatus for transmitting a transport block in a transmission occasion. According to a possible embodiment, a configured-grant configuration can be received. The configured-grant configuration can configure periodic plurality of UL repetition bundles, each UL repetition bundle including a number of PUSCH repetitions. The periodic plurality of UL repetition bundles can include a plurality of transmission occasions. A first TB can be transmitted in UL resources corresponding to at least a portion of an UL repetition bundle of the periodic plurality of UL repetition bundles. An indication can be received from a network. A transmission occasion among the plurality of transmission occasions of the periodic plurality of UL repetition bundles can be determined based on the indication allowing transmission of a second TB in UL resources. The second TB can be transmitted in the determined transmission occasion. The second TB can include different data from the first TB.

According to another possible embodiment, a configured-grant configuration can be transmitted. The configured-grant configuration can configure periodic plurality of UL repetition bundles with each UL repetition bundle including a number of PUSCH repetitions. The periodic plurality of UL repetition bundles can include a plurality of transmission occasions. A first TB can be received in UL resources corresponding to at least a portion of an UL repetition bundle of the periodic plurality of UL repetition bundles. An indication can be determined. The indication can be transmitted. A second TB can be received in a transmission occasion. The second TB can include different data from the first TB. The transmission occasion can be determined by a device based on the indication and among the plurality of transmission occasions of the periodic plurality of UL repetition bundles to transmit the second TB in UL resources.

At least some embodiments can provide a method and apparatus for URLLC operation with configured grants. At least some embodiments can also provide a method and apparatus to enable configured grant operation when an associated PDCCH, such as a PDCCH containing early termination ACK, is repeated multiple times. For example, a UE can determine when to transmit a new TB using a same HARQ process when early termination is sent via a PDCCH for a TB corresponding to a HARQ process, if the PDCCH is repeated multiple times in different symbols/TTIs to increase PDCCH reception reliability, considering the UE may not receive all the transmitted PDCCHs indicating early termination.

Figure 1:
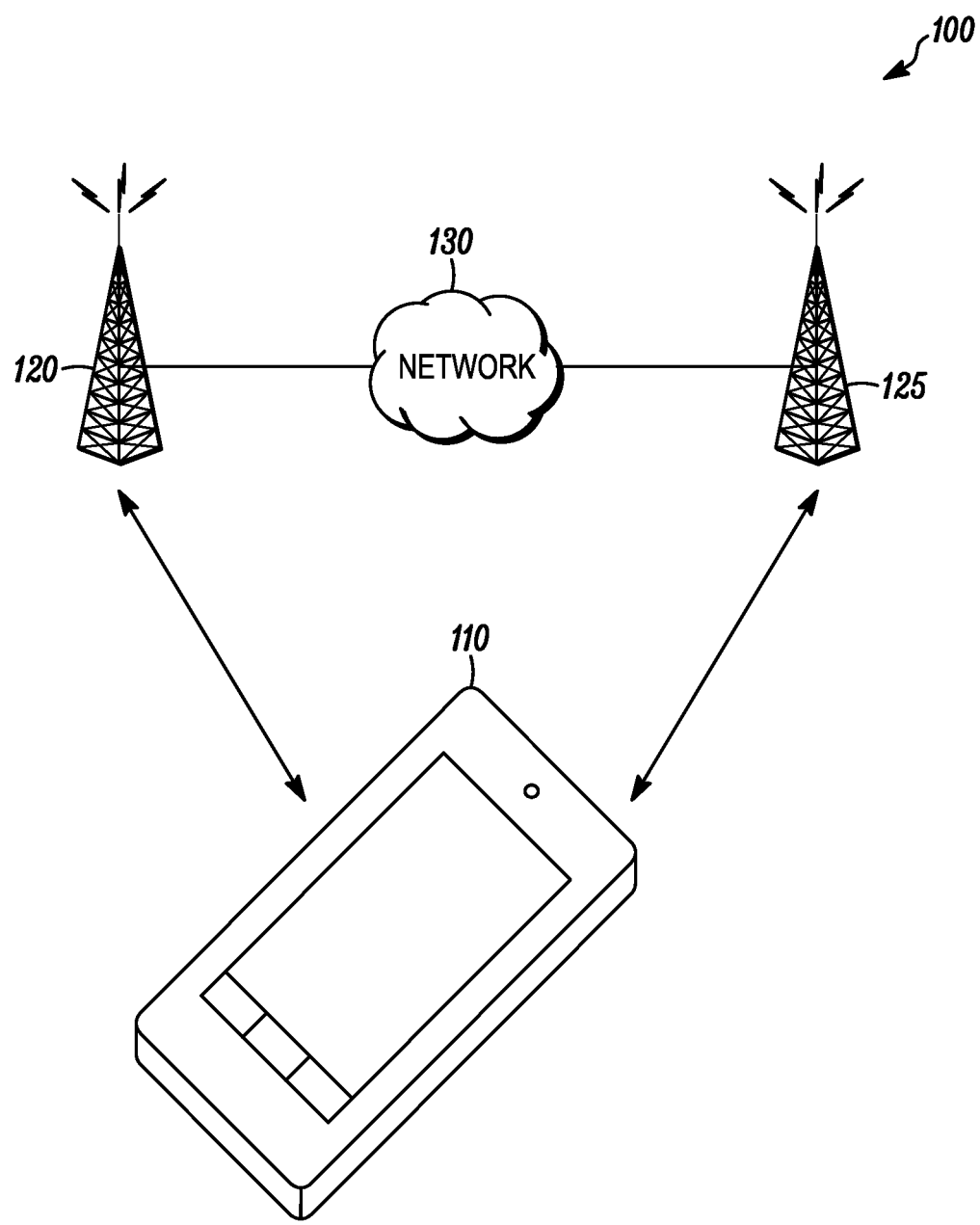
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission/Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

For increasing reliability of DL/UL transmissions, PDSCH/PUSCH and/or associated PDCCH can be repeated multiple times. For Long Term Evolution (LTE)-High-Reliable Low Latency Communication (HRLLC), such as Ultra-Reliable Low Latency Communication (URLLC) with LTE operation, the PDCCH can indicate a number of PDSCH transmissions associated with the PDCCH. The PDCCH may or may not be transmitted with a PDSCH repetition. A number of the PDSCH transmissions can be soft combined after a PDCCH is successfully received. The number of PDSCH transmissions associated with the PDCCH starting with the current TTI can be indicated in a DCI field.

In existing 5G NR specifications, PDSCH/PUSCH can be repeated by a configured number of repetitions for both dynamic and configured grant operations. A single PDCCH can schedule the PDSCH/PUSCH in case of dynamic grant operation.

To ensure K repetitions, according to TS 38.214 Rel-15, for any Redundancy Version (RV) sequence, the repetitions can be terminated after transmitting K repetitions, at the last transmission occasion among the K repetitions within the period P, or when a UL grant for scheduling the same TB is received within the period P, whichever is reached first. The UE may not be expected to be configured with the time duration for the transmission of K repetitions larger than the time duration derived by the periodicity P. One way to avoid situations where not all of the K repetitions are possible can be to enable multiple simultaneously active CG configurations, which can be similar to LTE-HRLLC.

Figure 2:
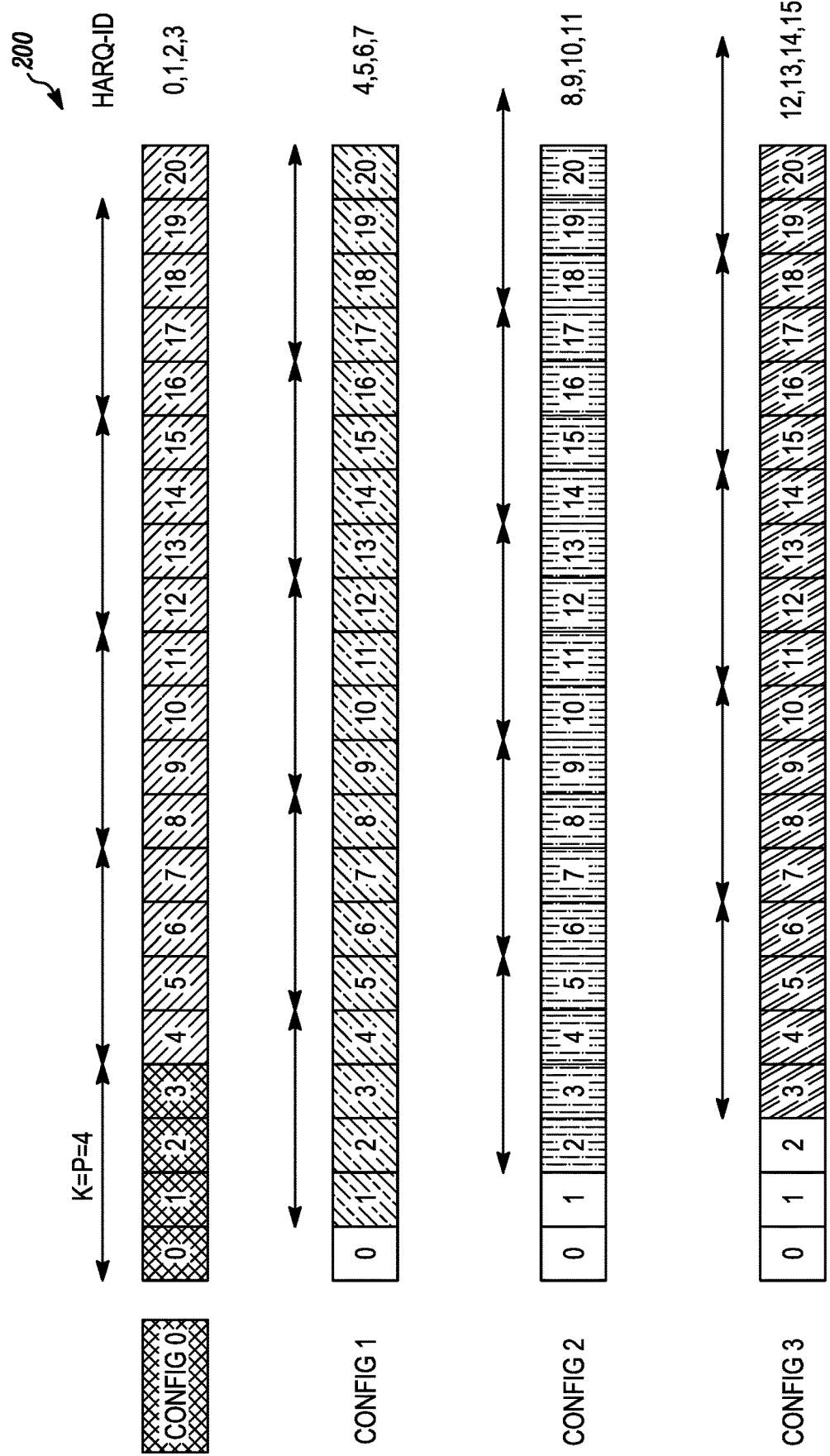
FIG. 2 is an example illustration of configured grant configurations according to a possible embodiment.

FIG. 2 is an example illustration 200 of CG configurations according to a possible embodiment. The illustration 200 shows four CG configurations that can be simultaneously active for the UE, where 20 TTIs are shown for each CG configuration. The UE can choose the configuration for transmission of a TB based on the TB arrival time. For example, if data can be transmitted in TTI 0, the UE can choose configuration 0 and if data is ready to be transmitted in TTI 1, the UE can choose configuration 1, and so on. To reduce the latency of the CG operation in case a TB is repeated multiple times, such as in multiple TTIs or in multiple transmission occasions in a transmission/repetition bundle, a UE can have/use multiple simultaneously active SPS/Grant-Free (GF) configurations on the same serving cell.

For instance, assuming K=P=4 TTIs, and having K configurations, with periodicity P, each configuration is offset by one TTI compared to the next configuration, the UE can be able to start UL transmission repetition bundle in each TTI via choosing the appropriate CG configuration shown in the illustration 200. The HARQ processes can be distributed among the configurations. To help a base station, such as a gNB, distinguish which configuration is used, different Demodulation Reference Signals (DMRSs), such as different DMRS sequences, can be used for different configurations.

In NR Rel-15, for a given HARQ process, the UE may not use the configured grant resource for a new transmission unless it receives an UL grant for (re)activation of the CG PUSCH in case of CG type 2, it receives a reconfiguration message/(re)initialization of UL grant before the configuredGrantTimer timer expires, or when the configuredGrantTimer timer expires or is not running. The UE can assume ACK if the configuredGrantTimer timer is not running.

By introducing an explicit HARQ feedback for configured UL transmissions of a UE, the explicit HARQ feedback for configured UL transmissions can avoid unnecessary UL repetitions of a repetition bundle, such as repetitions of a TB that can be configured by higher layer parameter RepK. This can help in collision reduction, such as if another UE has been configured with the same/overlapping time-frequency resources and non-orthogonal DMRS ports compared to the UE. This can also help in UE transmit power reduction or UE power savings. This can also help in reduced UL interference. The explicit HARQ feedback for configured UL transmissions can allow the HARQ buffer to be flushed earlier and a new TB can be transmitted with the same HARQ process earlier, resulting in reducing latency. The explicit HARQ feedback for configured UL transmissions can increase packet reliability and reduce packet latency when a gNB does not detect the CG-PUSCH transmission, such as when PUSCH DMRS is not detected, and if the UE has not received any explicit HARQ feedback after certain time, the UE can retransmit the TB, such as by using CG transmission occasions autonomously.

In at least some embodiments, the terms "mini-slot" or "aggregated slots" can also be used instead of "slot". The notion of slot/mini-slot/aggregated slots can be described as defined in TS 38.211/TS 38.213/TS 38.214.

According to TS 38.331, the Information Element (IE) ConfiguredGrantConfig can be used to configure uplink transmission without dynamic grant according to two possible schemes. The actual uplink grant may either be configured via RRC (type1) or provided via the PDCCH addressed to CS-RNTI type2. The field descriptions for ConfiguredGrantConfig from TS 38.331 are shown in Table 1.

TABLE 1

Field Descriptions for ConfiguredGrantConfig
ConfiguredGrantConfig field descriptions antennaPort
Indicates the antenna port(s) to be used for this configuration, and the maximum bitwidth is 5.
See TS 38.214, section 6.1.2, and TS 38.212, section 7.3.1.
cg-DMRS-Configuration
DMRS configuration, corresponds to L1 parameter 'UL-TWG-DMRS' (see TS 38.214, section 6.1.2).
configuredGrantTimer
Indicates the initial value of the configured grant timer (see TS 38.321,) in number of periodicities.
dmrs-SeqInitialization
The network configures this field if transformPrecoder is disabled. Otherwise the field is absent.
frequencyDomainAllocation
Indicates the frequency domain resource allocation, see TS 38.214, section 6.1.2, and TS 38.212, section 7.3.1).
frequencyHopping
The value intraSlot enables 'Intra-slot frequency hopping' and the value interSlot enables 'Inter-slot frequency hopping'. If the field is absent, frequency hopping is not configured.
frequencyHoppingOffset
Enables intra-slot frequency hopping with the given frequency hopping offset. Frequency hopping offset used when frequency hopping is enabled. Corresponds to L1 parameter 'Frequency-hopping-offset' (see TS 38.214, section 6.1.2).
mcs- Table
Indicates the MCS table the UE shall use for PUSCH without transform precoding. If the field is absent the UE applies the value 64QAM.
mcs-TableTransformPrecoder
Indicates the MCS table the UE shall use for PUSCH with transform precoding. If the field is absent the UE applies the value 64QAM.
mcsAndTBS
The modulation order, target code rate and TB size (see T538.214, section 6.1.2). The NW does not configure the values 28~31 in this version of the specification.
nrofHARQ-Processes
The number of HARQ processes configured. It applies for both Type 1 and Type 2. See TS 38.321, section 5.4.1.
p0-PUSCH-Alpha
Index of the P0-PUSCH-AlphaSet to be used for this configuration.
periodicity
Periodicity for UL transmission without UL grant for type 1 and type 2. Corresponds to L1 parameter 'UL-TWG-periodicity' (see TS 38.321, section 5.8.2).
The following periodicities are supported depending on the configured subcarrier spacing [symbols]:
15 kHz: 2, 7, n*14, where n = {1, 2, 4, 5, 8, 10, 16, 20, 32, 40, 64, 80, 128, 160, 320, 640}
30 kHz: 2, 7, n*14, where n = {1, 2, 4, 5, 8, 10, 16, 20, 32, 40, 64, 80, 128, 160, 256, 320, 640, 1280}
60 kHz with normal CP: 2, 7, n*14, where n = {1, 2, 4, 5, 8, 10, 16, 20, 32, 40, 64, 80, 128, 160, 256, 320, 512, 640, 1280, 2560}
60 kHz with ECP: 2, 6, n*12, where n = {1, 2, 4, 5, 8, 10, 16, 20, 32, 40, 64, 80, 128, 160, 256, 320, 512, 640, 1280, 2560}
120 kHz: 2, 7, n*14, where n = {1, 2, 4, 5, 8, 10, 16, 20, 32, 40, 64, 80, 128, 160, 256, 320, 512, 640, 1024, 1280, 2560, 5120}
(see 38.214, Table 6.1.2.3-1)
powerControlLoopToUse TABLE 1-continued Field Descriptions for ConfiguredGrantConfig
ConfiguredGrantConfig field descriptions Closed control loop to apply. Corresponds to L1 parameter 'PUSCH-closed-loop-index' (see TS 38.213, section 7.7.1).
rbg-Size
Selection between configuration 1 and configuration 2 for RBG size for PUSCH. When the field is absent the UE applies the value config1. The NW may only set the field to config2 if resourceAllocation is set to resourceAllocationType0 or dynamicSwitch. Note: rbg-Size is used when the transformPrecoder parameter is disabled.
repK-RV
The redundancy version (RV) sequence to use. See TS 38.214, section 6.1.2. The network configures this field if repetitions are used, i.e., if repK is set to n2, n4 or n8. Otherwise, the field is absent.
repK
The number or repetitions of K.
resourceAllocation
Configuration of resource allocation type 0 and resource allocation type 1. For Type 1 UL data transmission without grant, "resourceAllocation" should be resourceAllocationType0 or resourceAllocationType1.
rrc-ConfiguredUplinkGrant
Configuration for "configured grant" transmission with fully RRC-configured UL grant (Type1). If this field is absent the UE uses UL grant configured by DCI addressed to CS-RNTI (Type2). Type 1 configured grant may be configured for UL or SUL, but not for both simultaneously.
srs-ResourceIndicator
Indicates the SRS resource to be used.
timeDomainAllocation
Indicates a combination of start symbol and length and PUSCH mapping type, see TS 38.214, section 6.1.2 and TS 38.212, section 7.3.1.
timeDomainOffset
Offset related to SFN = 0, see TS 38.321, section 5.8.2.
transformPrecoder
Enables or disables transform precoding for type1 and type2. If the field is absent, the UE enables or disables transform precoding in accordance with the field msg3-transformPrecoder in RACH-ConfigCommon, see 38.214, section 6.1.3.
uci-OnPUSCH
Selection between and configuration of dynamic and semi-static beta-offset. For Type 1 UL data transmission without grant, uci-OnPUSCH should be set to semiStatic.

According to TS 38.321 section 5.4.1 for UL grant reception, an UL grant can be received dynamically on the PDCCH, received in a Random Access Response (RAR), or configured semi-persistently by RRC. The MAC entity can have an uplink grant to transmit on the Uplink Shared Channel (UL-SCH). To perform the requested transmissions, the MAC layer can receive HARQ information from lower layers.

Further according to TS 38.321, if the MAC entity has a Cell-RNTI (C-RNTI), a Temporary C-RNTI, or CS-RNTI, the MAC entity can for each PDCCH occasion and for each serving cell belonging to a Timing Advance Group (TAG) that has a running timeAlignmentTimer and for each grant received for this PDCCH occasion:

1> if an uplink grant for this Serving Cell has been received on the PDCCH for the MAC entity's C-RNTI or Temporary C-RNTI; or
1> if an uplink grant has been received in a Random Access Response:
   2> if the uplink grant is for MAC entity's C-RNTI and if the previous uplink grant delivered to the HARQ entity for the same HARQ process was either an uplink grant received for the MAC entity's CS-RNTI or a configured uplink grant:
      3> consider the NDI to have been toggled for the corresponding HARQ process regardless of the value of the NDI.
   2> if the uplink grant is for MAC entity's C-RNTI, and the identified HARQ process is configured for a configured uplink grant:
      3> start or restart the configuredGrantTimer for the corresponding HARQ process, if configured.
   2> deliver the uplink grant and the associated HARQ information to the HARQ entity.
1> else if an uplink grant for this PDCCH occasion has been received for this Serving Cell on the PDCCH for the MAC entity's CS-RNTI:
   2> if the NDI in the received HARQ information is 1:
      3> consider the NDI for the corresponding HARQ process not to have been toggled;
      3> start or restart the configuredGrantTimer for the corresponding HARQ process, if configured;
      3> deliver the uplink grant and the associated HARQ information to the HARQ entity.
   2> else if the NDI in the received HARQ information is 0:
      3> if PDCCH contents indicate configured grant Type 2 deactivation:
         4> trigger configured uplink grant confirmation.
      3> else if PDCCH contents indicate configured grant Type 2 activation:
         4> trigger configured uplink grant confirmation;
         4> store the uplink grant for this Serving Cell and the associated HARQ information as configured uplink grant;
         4> initialize or re-initialize the configured uplink grant for this Serving Cell to start in the associated PUSCH duration and to recur according to rules in subclause 5.8.2;
         4> set the HARQ Process ID to the HARQ Process ID associated with this PUSCH duration;
         4> consider the NDI bit for the corresponding HARQ process to have been toggled;

4> stop the configuredGrantTimer for the corresponding HARQ process, if running;
4> deliver the configured uplink grant and the associated HARQ information to the HARQ entity.

For each Serving Cell and each configured uplink grant, if configured and activated, the MAC entity shall:
1> if the PUSCH duration of the configured uplink grant does not overlap with the PUSCH duration of an uplink grant received on the PDCCH for this Serving Cell:
2> set the HARQ Process ID to the HARQ Process ID associated with this PUSCH duration;
2> if the configuredGrantTimer for the corresponding HARQ process is not running:
3> consider the NDI bit for the corresponding HARQ process to have been toggled;
3> deliver the configured uplink grant and the associated HARQ information to the HARQ entity.

For configured uplink grants, the HARQ Process ID associated with the first symbol of a UL transmission can be derived from the following equation:

HARQ Process ID=[floor(CURRENT_symbol/periodicity)]modulo nrofHARQ-Processes where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211.

CURRENT_symbol can refer to the symbol index of the first transmission occasion of a repetition bundle that takes place. A HARQ process can be configured for a configured uplink grant if the configured uplink grant is activated and the associated HARQ process ID is less than nrofHARQ-Processes.

According to TS 38.321 section 5.8.1, SPS is configured by RRC per Serving Cell and per Bandwidth Part (BWP). Multiple configurations can be active simultaneously only on different Serving Cells. Activation and deactivation of the DL SPS can be independent among the Serving Cells.

For the DL SPS, a DL assignment is provided by PDCCH, and stored or cleared based on L1 signalling indicating SPS activation or deactivation.

RRC configures the following parameters when SPS is configured:
cs-RNTI: CS-RNTI for activation, deactivation, and retransmission;
nrofHARQ-Processes: the number of configured HARQ processes for SPS;
periodicity: periodicity of configured downlink assignment for SPS.

When SPS is released by upper layers, all the corresponding configurations shall be released.

After a downlink assignment is configured for SPS, the MAC entity shall consider sequentially that the Nth downlink assignment occurs in the slot for which:

(numberOfSlotsPerFrame×SFN+slot number in the frame)=[(numberOfSlotsPerFrame×SFNstart time+slotstart time)+N×periodicity×numberOfSlotsPerFrame/10]modulo (1024×numberOfSlotsPerFrame)

where SFNstart time and slotstart time are the SFN and slot, respectively, of the first transmission of PDSCH where the configured downlink assignment was (re-)initialised.

According to TS 38.214 section 6.1.2.3, when PUSCH resource allocation is semi-statically configured by higher layer parameter ConfiguredGrantConfig in BWP information element, and the PUSCH transmission corresponding to the configured grant triggered, the following higher layer parameters are applied in the transmission:
For Type 1 PUSCH transmissions with a configured grant, the following parameters are given in ConfiguredGrantConfig:
The higher layer parameter timeDomainAllocation value m provides a row index m+1 pointing to an allocated table, indicating a combination of start symbol and length and PUSCH mapping type, where the table selection follows the rules for the UE specific search space, as defined in sub-clause 6.1.2.1.1;
Frequency domain resource allocation is determined by the higher layer parameter frequencyDomainAllocation according to the procedure in Subclause 6.1.2.2 for a given resource allocation type indicated by resourceAllocation;
The IMCS is provided by higher layer parameter mcsAndTBS;
Number of DM-RS CDM groups, DM-RS ports, SRS resource indication and DM-RS sequence initialization are determined as in Subclause 7.3.1.1 of [5, TS 38.212], and the antenna port value, the bit value for DM-RS sequence initialization, precoding information and number of layers, SRS resource indicator are provided by antennaPort, dmrs-SeqInitialization, precodingAndNumberOfLayers, and srs-ResourceIndicator respectively;
When frequency hopping is enabled, the frequency offset between two frequency hops can be configured by higher layer parameter frequencyHoppingOffset.
For Type 2 PUSCH transmissions with a configured grant:
the resource allocation follows the higher layer configuration according to [10, TS 38.321], and UL grant received on the DCI.
The UE shall not transmit anything on the resources configured by ConfiguredGrantConfig if the higher layers did not deliver a transport block to transmit on the resources allocated for uplink transmission without grant.
A set of allowed periodicities P are defined in TS 38.331.
The higher layer configured parameters repK and repK-RV define the K repetitions to be applied to the transmitted transport block, and the redundancy version pattern to be applied to the repetitions. For the nth transmission occasion among K repetitions, n=1, 2, . . . , K, it is associated with (mod(n−1,4)+1)th value in the configured RV sequence. The initial transmission of a transport block may start at
the first transmission occasion of the K repetitions if the configured RV sequence is {0,2,3,1},
any of the transmission occasions of the K repetitions that are associated with RV=0 if the configured RV sequence is {0,3,0,3},
any of the transmission occasions of the K repetitions if the configured RV sequence is {0,0,0,0}, except the last transmission occasion when K=8.
For any RV sequence, the repetitions shall be terminated after transmitting K repetitions, or at the last transmission occasion among the K repetitions within the period P, or when a UL grant for scheduling the same TB is received within the period P, whichever is reached first. The UE is not expected to be configured with the time duration for the transmission of K repetitions larger than the time duration derived by the periodicity P.

For both Type 1 and Type 2 PUSCH transmissions with a configured grant, when the UE is configured with repK>1, the UE shall repeat the TB across the repK consecutive slots applying the same symbol allocation in each slot. If the UE procedure for determining slot configuration, as defined in subclause 11.1 of TS 38.213, determines symbols of a slot allocated for PUSCH as downlink symbols, the transmission on that slot is omitted for multi-slot PUSCH transmission.

Figure 3:
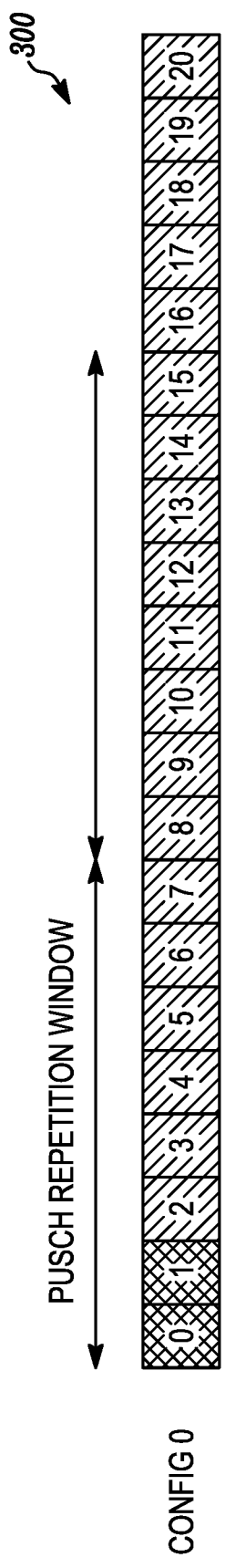
FIG. 3 is an example illustration of an UL repetition bundle having 8 Transmit Time Intervals (TTIs) according to a possible embodiment.

FIG. 3 is an example illustration 300 of an UL repetition bundle having 8 TTIs where the gNB has decoded the TB after receiving the first two transmissions of the repetition bundle. TTIs are numbered from 0-20. In this example embodiment, assume the UE uses a first CG configuration, such as config0 also shown in the illustration 200, to transmit a first TB K times, and assume the gNB decodes the TB after the X transmissions in a repetition bundle, and sends one early termination PDCCH in a first DL TTI, and a second early termination PDCCH in a second DL TTI. Assume K=P=8 TTIs. For example, a TTI can be a slot composed of 14 OFDM symbols or a TTI can be a mini-slot composed of 4 OFDM symbols and the CG-PUSCH transmissions may not occur in the last two symbols of a slot. Assume X=2.

Assume the first PDCCH, if decoded by the UE, can indicate the UE to stop the UL repetition bundle after Y1 UL transmissions, where Y1+1 can be the earliest possible UL transmission to stop, respecting a first PDCCH-to-PUSCH processing timeline. A PDCCH-to-PUSCH processing timeline can be a processing time from a PDCCH, such as a PDCCH containing a grant/UL allocation/trigger, to a PUSCH, such as a PUSCH granted by the grant/UL allocation/trigger and/or corresponding to the PDCCH. Assume the second PDCCH, if decoded by the UE, can indicate the UE to stop the UL repetition bundle after Y2 UL transmissions, where Y2+1 can be the earliest possible UL transmission to stop, respecting the first PDCCH-to-PUSCH processing timeline.

Alternatively, upon receiving a PUSCH early termination DCI in slot/TTI n, the UE can be indicated a value of k to stop the ongoing PUSCH transmission in slot/TTI n+k, where k can be selected such that it respects the PDCCH-to-PUSCH processing timeline. In one example, the value of k may not be indicated and a default value, such as a minimum value, can be used respecting the processing timeline described below.

To respect the PDCCH-to-PUSCH processing timeline, the value of Y1, Y2, k can be selected such as, for example, >=, such as equal to or larger than, the minimum possible value of slot/TTI-offset K2 values, such as configured in PUSCH-TimeDomainResourceAllocationList IE, or otherwise default values as function of subcarrier spacing. The value of Y1, Y2, k can be selected such as, for example, >=, such as equal to or larger than, symbol L2, where L2 can be defined as the next uplink symbol with its Cyclic Prefix (CP) starting $T_{proc,2}$ after the end of the last symbol of the early termination PDCCH DCI, such as in case of a transmission of a new TB, such as described later below. The symbol L2 can be some symbol within a TTI. For PDCCH with only explicit HARQ-ACK feedback, $$T_{proc,2} = N_2(2048+144)\cdot\kappa 2^{-\mu}\cdot T_c.$$

In one example, the above value of $T_{proc,2}$ may be when the PDCCH DCI is for only explicit HARQ-ACK feedback. For a case of PDCCH with UL grant scheduling new UL data, $$T_{proc,2} = \max((N_2+d_{2,1})(2048+144)\cdot\kappa 2^{-\mu}\cdot T_c, d_{2,2}).$$

The variables above can be defined in TS 38.214 section 6.4. For example, according to TS 38.214 section 6.4, $N_2$ is based on µ of Table 6.4-1 and Table 6.4-2 for UE processing capability 1 and 2 respectively, where µ corresponds to the one of ($\mu_{DL}, \mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and κ is defined in subclause 4.1 of TS 38.211. If the first symbol of the PUSCH allocation consists of DMRS only, then $d_{2,1}=0$, otherwise $d_{2,1}=1$. In one embodiment, the first CG PUSCH transmission of a TB other than the TB the early termination indication is sent for, may not start earlier than symbol L2, where L2 can be defined as the next uplink symbol with its CP starting a first $T_{proc,2}$ value after the end of the last symbol of the early termination PDCCH DCI. The first $T_{proc,2}$ value can be smaller than a second $T_{proc,2}$ value associated with PUSCH dynamic scheduling. Where the variables are defined in section 6.4 of TS 38.214, UE PUSCH preparation procedure time, in one example, the value of $N_2$ may be decreased by u symbols, such as u=3 or 6. The u value can depend on PUSCH timing capability, as to stop the UL transmission the UE may need to only process the PDCCH. Similarly, the value of slot/TTI-offset $K_2$ can also be reduced.

At least some embodiments can determine when the UE can start a new TB upon reception of the early termination with the same HARQ-ID or a HARQ-ID associated with the CG-configuration, depending on which of the first and second PDCCHs the UE has received. In the following, it can be assumed that Y1=3, and Y2=5.

Figure 4:
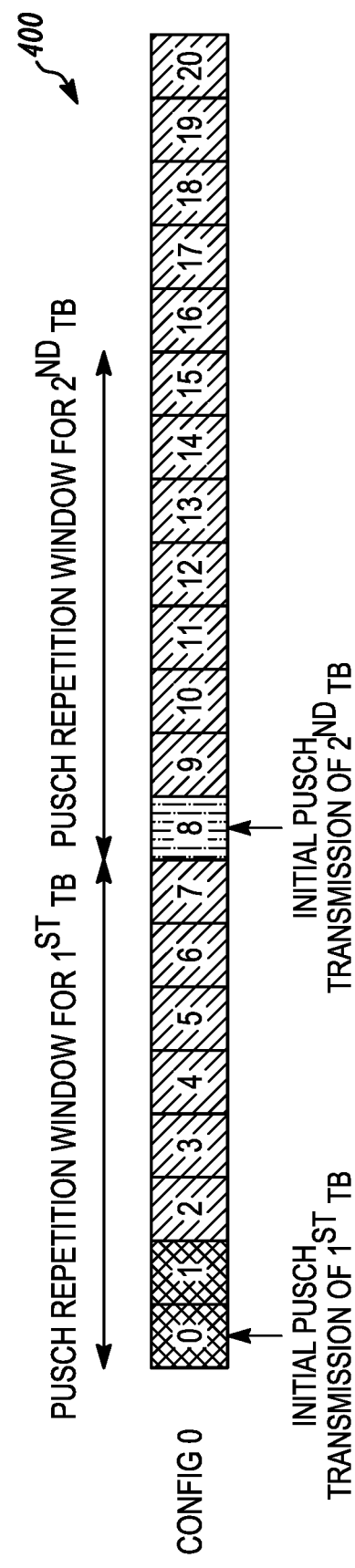
FIG. 4 is an example illustration of a UL repetition bundle having 8 TTIs according to a possible embodiment.

FIG. 4 is an example illustration 400 of a UL repetition bundle having 8 TTIs where a gNB has decoded the TB after receiving the first two transmissions of the repetition bundle, according to a possible embodiment. TTIs are numbered from 0-20. Any new TB with the same HARQ process using configured-grant resources can be transmitted from the beginning of the next repetition bundle. For example, if the UE has received either of the first or the second PDCCH, the UE can start a new TB, such as a second TB, from the first transmission occasion of the next period.

According to another possible embodiment, if the UE has received either of the first or the second PDCCH, the UE can start a new TB from a transmission occasion of the same period. The transmission occasion can be determined according to at least one of a field in the DCI of the PDCCH, time/frequency location of the PDCCH, a configured number of repetitions or repetition window length, such as in number of UL TTIs, a period P, a number of simultaneously active configured grants, a number of HARQ-processes configured for the configured grant associated with the TB, a higher layer indication, a TTI length in number of symbols, a processing timeline of PDCCH-to-PUSCH, a configured RV sequence, such as where the transmission occasion can correspond to RV0 in the sequence, and/or a subcarrier spacing of the corresponding BWP.

In an example, the PDCCH can indicate where, such as in which TTI of the first repetition bundle, to start a new TB when the UE has data to send. For instance, the UE can start the PUSCH transmissions of the second TB from, such as in, TTI 5.

FIG. 5 is an example illustration 500 of PUSCH transmissions of the second TB that may cross the boundary of period P at the boundary of the PUSCH repetition window for the first TB. For example, the second TB can be transmitted K times, such as 8 times, crossing the boundary of period P, such as at the end of TTI 7.

In another example, the second TB new UL data transmission can be transmitted until the end of the PUSCH repetition window, such as TTI 5, 6, and 7 in the illustration 500. In the next period, the UE can retransmit the second TB depending on the status of the configuredGrantTimer.

FIG. 6 is an example illustration 600 showing a case when the UE determines the transmission occasion within the first repetition bundle to transmit the initial PUSCH transmission of a second TB after reception of an early termination indication indicating the first TB is correctly received at the network, according to a possible embodiment. TTIs are numbered from 0-20. In this embodiment, when multiple CG configurations are simultaneously active, such as shown in the illustration 200, the UE may not be expected to start a new transmission, such as a third TB, associated with a different CG configuration, such as a different CG configuration than config0 shown in the illustration 600 in the next period, at least in transmission occasions wherein the transmission of the second TB and the third TB collide.

In an example, when the configuredGrantTimer is running at the next period, then retransmission can occur. In an example, the next period can be the next period associated with the same HARQ process. In another example, the next period can be the earliest next period after the current period, such as the next period of UL CG resources. In another example, the next period can be the earliest next period after the current period, such as the next period of UL CG resources, if that period does not contain the retransmissions corresponding to another HARQ process.

In another example, the second TB new UL data transmission can be transmitted until the end of the PUSCH repetition window, such as in TTIs 5, 6, and 7. In the next period, the UE can repeat the second TB depending on the status of the configuredGrantTimer.

In an example, in case of repetition/retransmission of the second TB in the next period, the RV sequence associated with the repetitions in the next period can be determined according to one of the following schemes. According to one scheme, for the $n^{th}$ transmission occasion among K' repetitions in the next period, n=1, 2, ..., K', the redundancy version can be associated with $(mod(n-1,4)+1)^{th}$ value in the configured RV sequence. According to another scheme, for the $n^{th}$ transmission occasion among K' repetitions in the next period, n=1, 2, ..., K', the redundancy version can be associated with $(mod(n-1+m,4)+1)^{th}$ value in the configured RV sequence. K' can be the number of remaining repetitions, such as K-m, where m can be the number of already transmitted repetitions of the TB. For instance, for the case of second TB transmission in TTIs 5, 6, and 7 in the example above, m=3.

According to a possible embodiment, the UE can start the transmission of the second TB from, such as in, the first transmission occasion of the next period if the UE receives an early termination PDCCH, such as either of the first PDCCH or the second PDCCH, corresponding to stopping from the $m^{th}$ TTI of the PUSCH repetition bundle. For example, if m>=6 in the illustration 600, the UE can start the second TB from TTI 8. As a further example, a window/bundle can be established where a UE can expect an early termination, such as an ACK.

In one example, when the UE is indicated or starts a new UL data transmission within the PUSCH repetition window, such as K TTIs, for the same HARQ process, the configuredGrantTimer for the corresponding HARQ process may not be started or restarted. This may be the case when the configuredGrantTimer is configured to a value other than one.

According to a possible embodiment, if a new TB, such as the PUSCH transmission of the second TB shown in the illustration 600, starts after transmission of a previous TB in the same repetition bundle or repetition period, referred to as repetition period 1 here, and the repetitions of the new TB crosses the boundary of period P, such as a boundary of repetition bundles, where the next period after repetition period 1 is called repetition period 2 here, the value of the configuredGrantTimer for the corresponding HARQ process may not be decreased by transitioning from repetition period 1 to repetition period 2. In an example the configuredGrantTimer for the corresponding HARQ process can be started or restarted in repetition period 1.

According to another possible embodiment, the UE may not expect to receive an early termination PDCCH indication corresponding to stopping UL transmissions of a CG-TB, such as a TB that is sent via CG, from/before the $m^{th}$ TTI of the PUSCH repetition bundle. The value of m can be determined according to at least one of a higher layer indication, a TTI length, a configured number of repetitions, and/or a processing timeline of PDCCH-to-PUSCH for stopping/terminating the PUSCH transmission, such as in multiple of TTIs.

According to another possible embodiment, the early-termination PDCCH indication can also indicate whether the remaining UL resources of the repetition bundle can be used for another TB or not for the UE, which can be referred to as the first UE. For example, when there are multiple simultaneously active configurations, another UE may be able to use the remaining resources, if the indication prohibits the first UE to use the remaining configured UL resources for transmission of a new TB.

According to another possible embodiment, if the UE has received the first PDCCH, the UE can start a new TB from a first transmission occasion, TO1, of the same period. If the UE has received the second PDCCH, the UE can start a new TB from a second transmission occasion, TO2, of the same period, where TO1 and TO2 can be different. According to another possible embodiment, the transmissions of the second TB can be terminated at the end of the first repetition bundle.

In the above embodiments, if the UE is configured with multiple simultaneously active CG configurations, the new TB can be sent using another configuration, such as a configuration other than Config0. However, in certain situations such a switch may not be possible/useful considering other HARQ processes might be already occupied and/or other configurations might have different periodicities or resource allocations.

Figure 7:
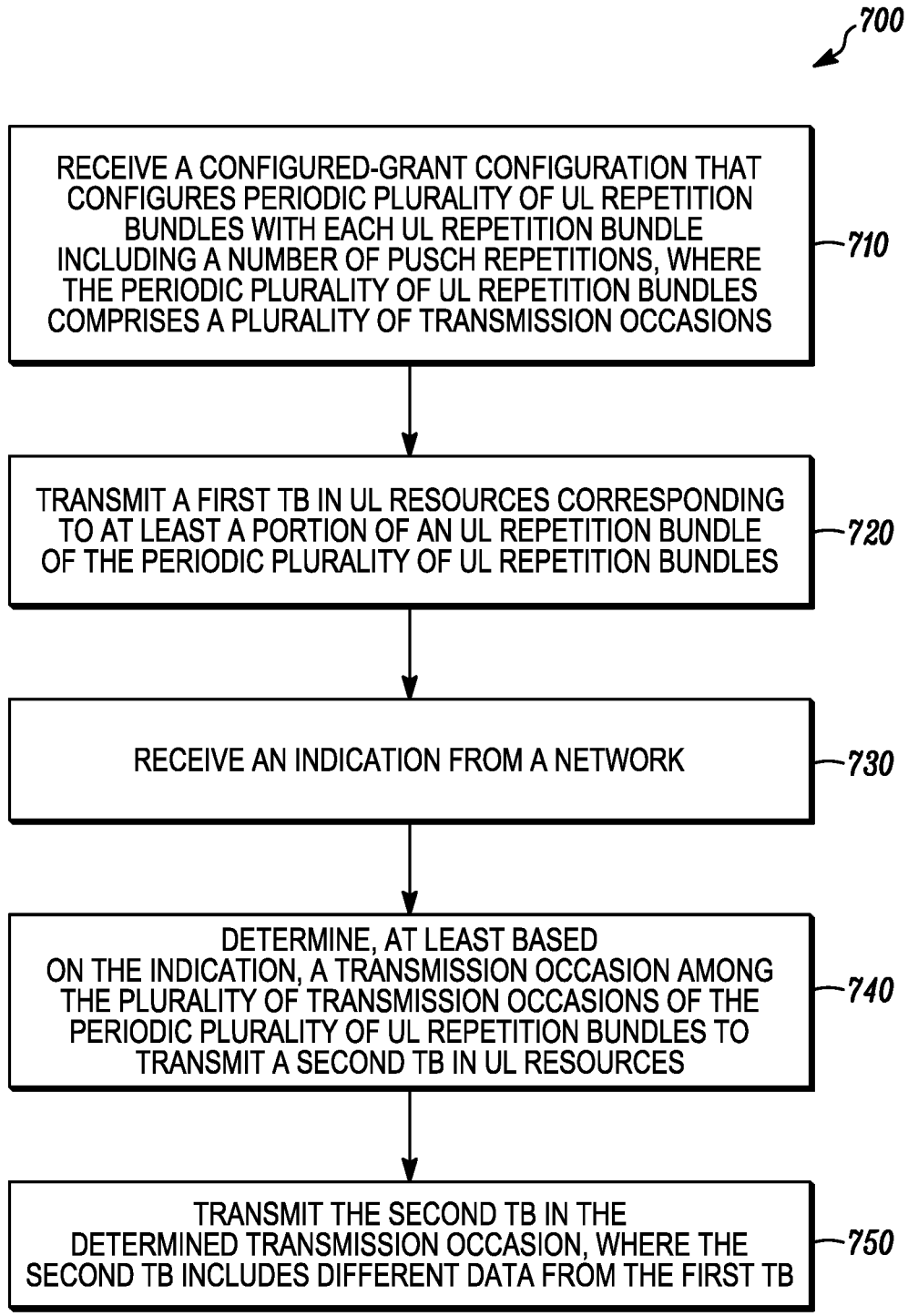
FIG. 7 is an example flowchart illustrating the operation of a wireless communication device according to a possible embodiment.

FIG. 7 is an example flowchart 700 illustrating the operation of a wireless communication device, such as the UE 110, according to a possible embodiment. At 710, a configured-grant configuration can be received. The configured-grant configuration can be a configured-grant configuration for UL transmissions without a dynamic grant in periodic UL repetition bundles of a number, K, of PUSCH repetitions. The configured-grant configuration can configure periodic plurality of UL repetition bundles with each UL repetition bundle including a number of PUSCH repetitions. Each PUSCH repetition can be in a different TTI/slot/minislot. The periodic plurality of UL repetition bundles can include a plurality of transmission occasions. The number of PUSCH repetitions can be a number of times to transmit a TB in each UL repetition bundle. Each repetition of the TB can be transmitted in certain transmission occasions of the UL repetition bundle.

At 720, a first TB can be transmitted in UL resources corresponding to at least a portion of an UL repetition bundle of the periodic plurality of UL repetition bundles. For example, the UL repetition bundle can include a plurality of transmission occasions of the plurality of transmission occasions of the periodic plurality of UL repetition bundles and the at least a portion of the UL repetition bundle can be one or more of the plurality of transmission occasions in the UL repetition bundle. As a further example, the first TB can be transmitted until the number of PUSCH repetitions is reached, until the last transmission occasion among the UL repetition bundle within the periodicity of the periodic UL repetition bundles, or until an indication is received from the network. In some instances, there may not be any PUSCH transmission of a TB, such as the first TB, as the UE may not have UL data. For example, the UE does not always need to transmit a TB.

At 730, an indication can be received from a network. The indication can be an acknowledgement of successful reception of the first TB, can be a PDCCH ACK, can be an indication to start a new UL data transmission, such as a second TB, for the same HARQ process associated with the first TB, can be an indication indicating the first TB has been successfully decoded, and/or can be any other related indication. According to a possible implementation, a HARQ process can be associated with the first TB and the can indicate to transmit/allow transmission of the second TB for the HARQ process associated with the first TB. For example, the first TB and the second TB can be associated with a same HARQ process. The first TB and the second TB can also be associated with different HARQ processes. The HARQ processes can be associated with the configured-grant configuration.

According to a possible embodiment, the plurality of transmission occasions of the periodic plurality of UL repetition bundles can include a first plurality of transmission occasions. The UL repetition bundle can include a second plurality of transmission occasions. The second plurality of transmission occasions can be a subset of the first plurality of transmission occasions. The indication can indicate termination of transmission of the first TB before a number of transmissions of the first TB corresponding to the number of PUSCH repetitions has been reached, and before a last transmission occasion of the second plurality of transmission occasions of the UL repetition bundle.

According to a possible embodiment, a time window in which the UE can receive the indication before the end of the UL repetition bundle can be determined. The time window can include a proper subset of a set of PDCCH monitoring occasions associated with the UL repetition bundle. The time window can be determined based on an uplink preparation time and based on the configured number of PUSCH repetitions, where the uplink preparation time comprises at least a time required to process the indication. The uplink preparation time can also include time required to stop the transmission of the first TB. The uplink preparation time can further be a processing time of PDCCH-to-PUSCH, such as PDCCH reception to corresponding PUSCH transmission. According to a possible implementation, a timer with a configured timer duration can be started when an initial transmission of the first TB starts and the time window can be determined based on at least two selected from the uplink preparation time, the configured number of PUSCH repetitions, and the configured timer duration. The timer can be a configuredGrantTimer where the UE can assume an ACK from the network for the TB if no retransmission is scheduled and the timer has expired. The length of timer can be in multiples of configuration periodicity, P.

At 740, a transmission occasion among the plurality of transmission occasions of the periodic plurality of UL repetition bundles can be determined, at least based on the indication, to transmit a second TB in UL resources. The second TB can include different data from the first TB. The transmission occasion can be determined to be a transmission occasion associated with a redundancy version of zero. The transmission occasion can also be determined based on a time location of the indication and/or a field in the indication. According to a possible embodiment, the transmission occasion can be a second transmission occasion to transmit the second TB and the transmission of the first TB can be stopped at a first transmission occasion, where the first transmission occasion can be before the second transmission occasion.

According to a possible embodiment, the plurality of transmission occasions of the periodic plurality of UL repetition bundles can be a first plurality of transmission occasions. The UL repetition bundle can include a second plurality of transmission occasions. The second plurality of transmission occasions of the UL repetition bundle can include the first transmission occasion and the second transmission occasion. The second transmission occasion to transmit the second TB can be determined among the second plurality of transmission occasions of the UL repetition bundle to transmit an initial transmission of the second TB. For example, the second transmission occasion can be one of the transmission occasions of the UL repetition bundle.

According to another possible embodiment, the plurality of transmission occasions of the periodic plurality of UL repetition bundles can be a first plurality of transmission occasions. The UL repetition bundle can include a second plurality of transmission occasions. Determining the second transmission occasion to transmit the second TB can include determining to delay initial transmission of the second TB to a next UL repetition bundle if the first transmission occasion is later than a given transmission occasion of the current UL repetition bundle. The second plurality of transmission occasions of the UL repetition bundle can include the first transmission occasion and the given transmission occasion. The given transmission occasion of the UL first repetition bundle can be a $n^{th}$ transmission occasion of the UL first repetition bundle. The given transmission occasion can be determined based on a higher layer indication, the number of PUSCH repetitions of the current repetition bundle, and/or other information. The number, such as K, of PUSCH repetitions can be a number of transmission occasions of the first repetition bundle.

According to another possible embodiment, determining the second transmission occasion to transmit the second TB further can include determining to delay initial transmission of the second TB until the next UL repetition bundle based on a field in the indication. The field can be in a DCI including the indication, such as an early termination indication. The field can indicate whether to use a current bundle or a next bundle for transmitting the second TB.

At 750, the second TB can be transmitted in the determined transmission occasion. For example, the second TB can be transmitted in a different transmission occasion from at least one transmission occasion in a UL repetition bundle used to transmit the first TB or can be sent in a different UL repetition bundle.

Figure 8:
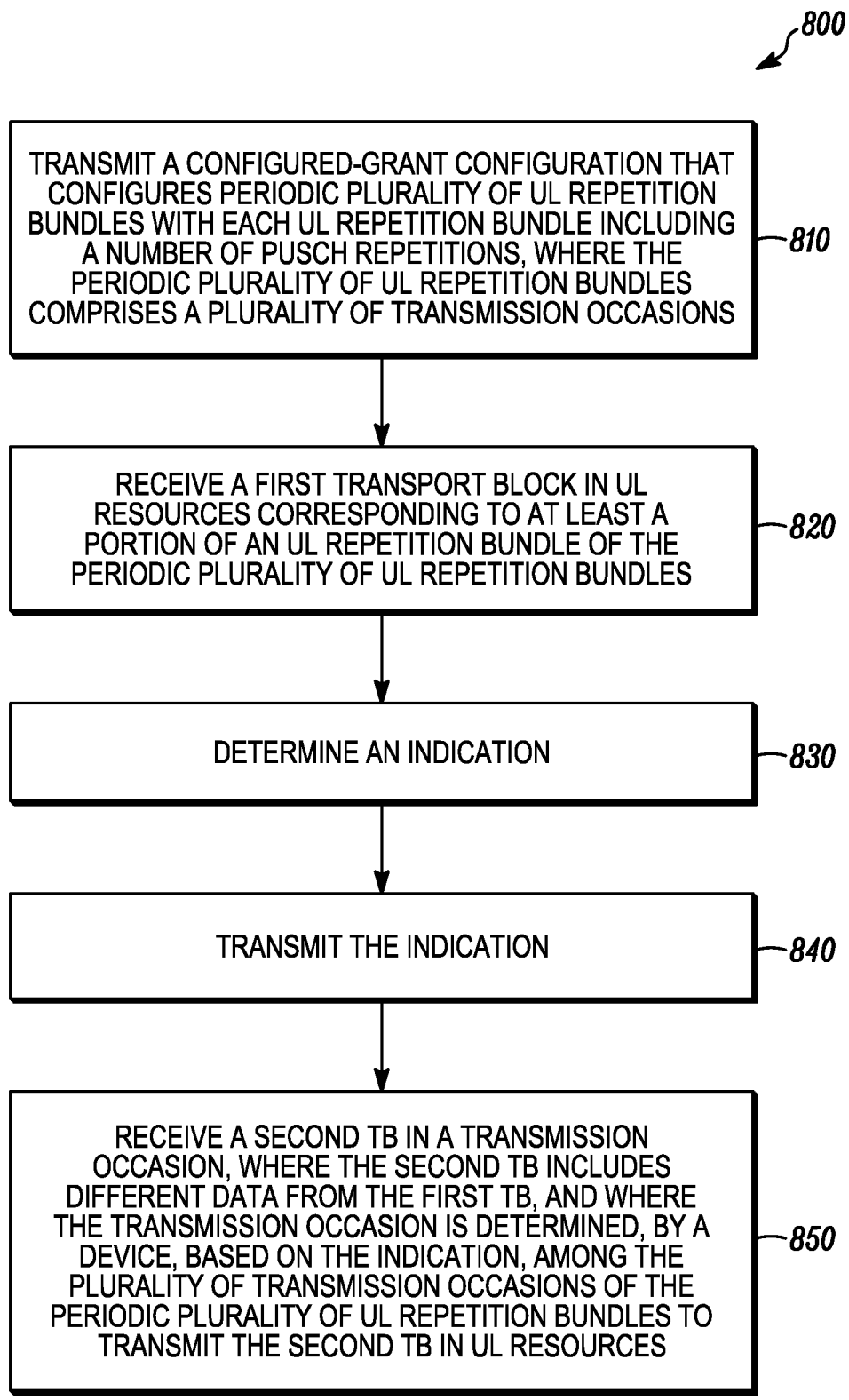
FIG. 8 is an example flowchart illustrating the operation of a wireless communication device according to a possible embodiment.

FIG. 8 is an example flowchart 800 illustrating the operation of a wireless communication device, such as the network entity 120, according to a possible embodiment. At 810, a configured-grant configuration can be transmitted. The configured-grant configuration can configure periodic plurality of UL repetition bundles with each UL repetition bundle including a number of PUSCH repetitions. The periodic plurality of UL repetition bundles can include a plurality of transmission occasions. At 820, a first TB can be received in UL resources corresponding to at least a portion of an UL repetition bundle of the periodic plurality of UL repetition bundles.

At 830, an indication can be determined. The indication can indicate the first TB has been successfully decoded. For example, the network entity can attempt to decode the first TB. Upon successful decoding of the first TB, the network entity can send the indication based on the first TB being successfully decoded. A HARQ process can be associated with the first TB and the indication can indicate to transmit a second TB for the HARQ process associated with the first TB. For example, the first TB and the second TB can be associated with a same HARQ process. According to a possible embodiment, the plurality of transmission occasions of the periodic plurality of UL repetition bundles can include a first plurality of transmission occasions. The UL repetition bundle can include a second plurality of transmission occasions. The indication can indicate termination of transmission of the first TB before a number of transmissions of the first TB corresponding to the number of PUSCH repetitions has been reached, and before a last transmission occasion of the second plurality of transmission occasions of the UL repetition bundle. At 840, the indication can be transmitted.

At 850, the second TB can be received in a transmission occasion. The second TB can include different data from the first TB. The transmission occasion can be determined, by a device, such as a UE, based on the indication and among the plurality of transmission occasions of the periodic plurality of UL repetition bundles to transmit the second TB in UL resources. The transmission occasion can further be determined by the device to be a transmission occasion associated with a redundancy version of zero.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 9:
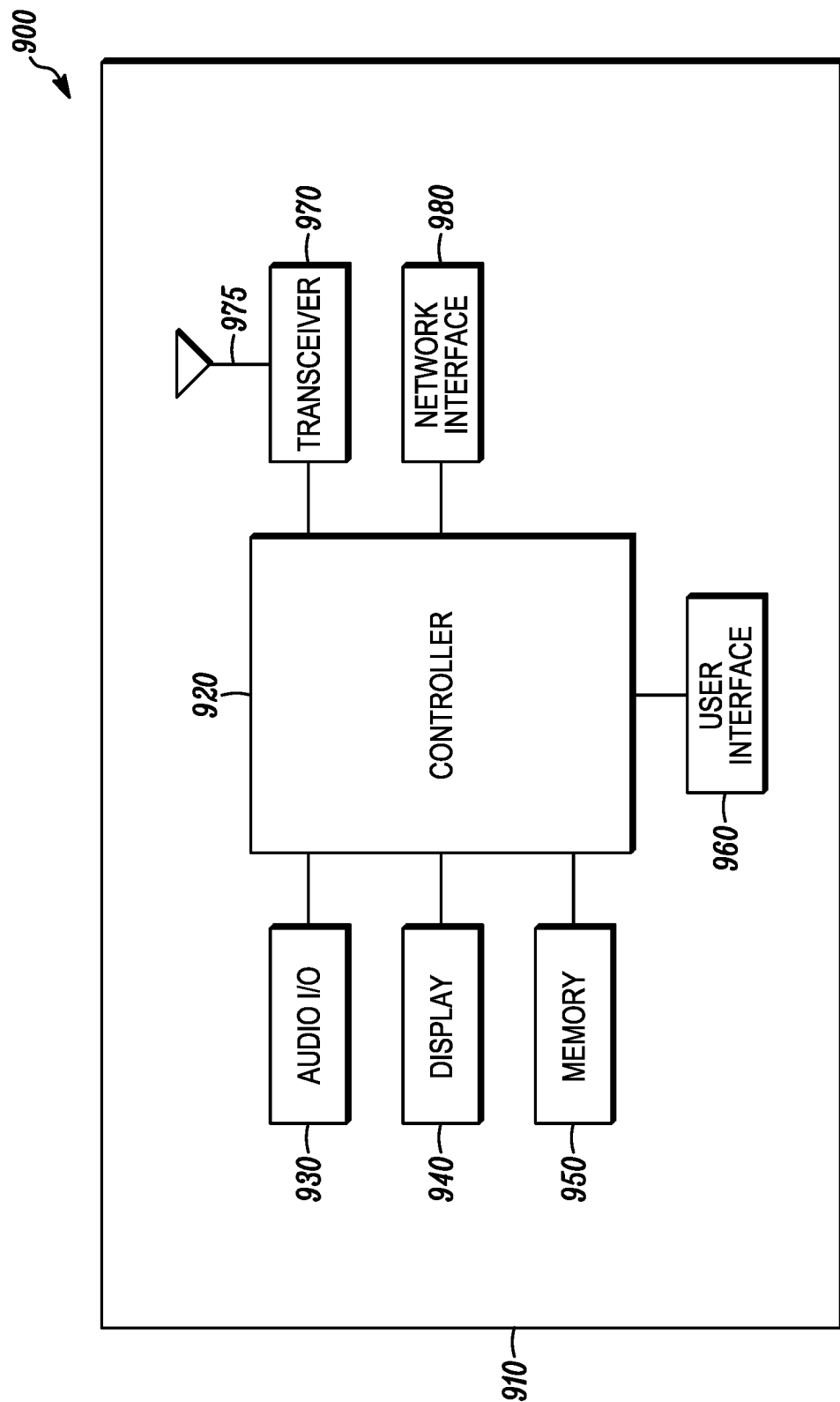
FIG. 9 is an example block diagram of an apparatus according to a possible embodiment.

FIG. 9 is an example block diagram of an apparatus 900, such as the UE 110, the network entity 120, or any other wireless communication device disclosed herein, according to a possible embodiment. The apparatus 900 can include a housing 910, a controller 920 coupled to the housing 910, audio input and output circuitry 930 coupled to the controller 920, a display 940 coupled to the controller 920, a memory 950 coupled to the controller 920, a user interface 960 coupled to the controller 920, a transceiver 970 coupled to the controller 920, at least one antenna 975 coupled to the transceiver 970, and a network interface 980 coupled to the controller 920. The apparatus 900 may not necessarily include all of the illustrated elements for different embodiments of the present disclosure. The apparatus 900 can perform the methods described in all the embodiments.

The display 940 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 970 can be one or more transceivers that can include a transmitter and/or a receiver. The audio input and output circuitry 930 can include a microphone, a speaker, a transducer, or any other audio input and output circuitry. The user interface 960 can include a keypad, a keyboard, buttons, a touch pad, a joystick, a touch screen display, another additional display, or any other device useful for providing an interface between a user and an electronic device. The network interface 980 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 950 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 900 or the controller 920 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 950, elsewhere on the apparatus 900, in cloud storage, and/or anywhere else that can store software and/or an operating system. The apparatus 900 or the controller 920 may also use hardware to implement disclosed operations. For example, the controller 920 may be any programmable processor. Furthermore, the controller 920 may perform some or all of the disclosed operations. For example, some operations can be performed using cloud computing and the controller 920 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 920 may be any controller or processor device or devices capable of operating an apparatus and implementing the disclosed embodiments. Some or all of the additional elements of the apparatus 900 can also perform some or all of the operations of the disclosed embodiments.

In operation, the apparatus 900 can perform the methods and operations of the disclosed embodiments. The transceiver 970 can transmit and receive signals, including control signals and data signals and including information, such as control and data information. The controller 920 can generate and process the transmitted and received signals and information.

In operation as a UE according to a possible embodiment, the transceiver 970 can receive a configured-grant configuration that configures periodic plurality of UL repetition bundles with each UL repetition bundle including a number of PUSCH repetitions. The periodic plurality of UL repetition bundles can include a plurality of transmission occasions. The transceiver 970 can transmit a first TB in UL resources corresponding to at least a portion of an UL repetition bundle of the periodic plurality of UL repetition bundles.

The transceiver 970 can receive an indication from a network. According to a possible embodiment, a HARQ process can be associated with the first TB and the indication can indicate to transmit a second TB for the HARQ process associated with the first TB. According to a possible embodiment, the controller 920 can determine a time window in which the apparatus 900 can receive the indication before the end of the UL repetition bundle. The time window can be a proper subset of a set of PDCCH monitoring occasions associated with the UL repetition bundle.

According to a possible embodiment, the plurality of transmission occasions of the periodic plurality of UL repetition bundles can include a first plurality of transmission occasions. The UL repetition bundle can include a second plurality of transmission occasions. The indication can indicate termination of transmission of the first TB before a number of transmissions of the first TB corresponding to the number of PUSCH repetitions has been reached and before a last transmission occasion of the second plurality of transmission occasions of the UL repetition bundle.

The controller 920 can determine, at least based on the indication, a transmission occasion among the plurality of transmission occasions of the periodic plurality of UL repetition bundles to transmit the second TB in UL resources. According to a possible embodiment, the transmission occasion can be a second transmission occasion to transmit the second TB and the transceiver 970 can stop the transmission of the first TB at a first transmission occasion, where the first transmission occasion can be before the second transmission occasion. The transceiver 970 can transmit the second TB in the determined transmission occasion. The second TB can include different data from the first TB.

In operation as a network entity according to a possible embodiment, the transceiver 970 can transmit a configured-grant configuration that configures periodic plurality of UL repetition bundles with each UL repetition bundle including a number of PUSCH repetitions. The periodic plurality of UL repetition bundles can include a plurality of transmission occasions. The transceiver 970 can receive a first TB in UL resources corresponding to at least a portion of an UL repetition bundle of the periodic plurality of UL repetition bundles.

The controller 920 can determine an indication. The indication can indicate the first TB has been successfully decoded. A HARQ process can be associated with the first TB and the indication can indicate to transmit/can allow transmission of the second TB for the HARQ process associated with the first TB. For example, the first TB and the second TB can be associated with the same HARQ process. According to a possible embodiment, the plurality of transmission occasions of the periodic plurality of UL repetition bundles can include a first plurality of transmission occasions. The UL repetition bundle can include a second plurality of transmission occasions. The indication can indicate termination of transmission of the first TB before a number of transmissions of the first TB corresponding to the number of PUSCH repetitions has been reached and before a last transmission occasion of the second plurality of transmission occasions of the UL repetition bundle. The transceiver 970 can transmit the indication.

The transceiver 970 can receive a second TB in a transmission occasion. The second TB can include different data from the first TB. The transmission occasion can be determined by a different device, such as a UE, based on the indication and among the plurality of transmission occasions of the periodic plurality of UL repetition bundles to transmit the second TB in UL resources. The transmission occasion can further be determined by the other device to be a transmission occasion associated with a redundancy version of zero.

Embodiments can provide for early termination in the context of configured grants. According to a possible embodiment, in configured grant, a new TB may be sent only on the next UL repetition bundle of the periodic UL repetition bundles. Embodiments can also provide for new TB transmission in a transmission occasion of the same uplink repetition bundle as first TB after receiving early termination. Embodiments can additionally provide for determining whether to transmit the new TB in the same uplink repetition bundle as the first TB or delay the new TB transmission until the next uplink repetition bundle based on a criterion.

Embodiments can further provide for determining in which transmission occasion of the configured grant resources of a period P, a new TB with the same HARQ process as an early terminated TB in the same period P is to be sent. The early termination indication may be repeated multiple times and a UE can determine the transmission occasion for sending the new TB based on which one of the early termination indications it has received. Embodiments can also provide for determining an UL symbol L2 where potential CG transmissions of a new TB after receiving early termination indication of a current TB should not start before L2, where L2 can be different than or the same as the value of L2 derived for PUSCH scheduling with dynamic grant. Embodiments can additionally provide for determining time instances where the UE does not expect to receive a PUSCH early termination indication. Embodiments can further provide for not decreasing the value of configuredGrantTimer when repetitions cross the boundary period.

At least some embodiments can provide a method at a UE. The method can include receiving a first configured-grant configuration for UL transmissions without a dynamic grant in periodic UL repetition bundles of K PUSCH repetitions. The method can include transmitting a first TB, associated with a first HARQ process, in UL resources corresponding to a first UL repetition bundle until a first indication is received from a network. The method can include starting a timer, with a configured timer duration, when the first transmission of the repetition bundle starts. The method can include receiving the first indication from a network, where the indication can indicate the first TB has been successfully decoded. The method can include determining, at least based on the time location of the first indication or a field in the first indication, a first transmission occasion to transmit new data of a second TB associated with a second HARQ process in UL resources corresponding to the first UL repetition bundle. The first and the second HARQ processes can be associated with the first configured-grant configuration.

The first and the second HARQ processes can be the same. The first transmission occasion can further be determined to be a transmission occasion associated with RV0. The UE may not be expected to receive the first indication after a first time instance before the end of the first repetition bundle where the first time instance can be determined based on at least two of the processing timeline of PDCCH-to-PUSCH, the number of configured repetitions, and/or the configured timer duration.

The UE can stop the transmission of the first TB at a second transmission occasion. The second transmission occasion can be before the first transmission occasion. Determining the first transmission occasion can include determining delaying initial transmission of the second TB to the next UL repetition bundle if the second transmission occasion is later than the $n^{th}$ transmission occasion of the first repetition bundle. Determining the first transmission occasion can include determining delaying initial transmission of the second TB to the next UL repetition bundle based on a field in the first indication. The $n^{th}$ transmission occasion can be determined based on a higher layer indication and/or a number of transmission occasions of the first repetition bundle.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,'" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus comprising:
   a transceiver that
      transmits a configured-grant configuration that configures a periodic plurality of uplink repetition bundles with each uplink repetition bundle including a number of physical uplink shared channel repetitions, where the periodic plurality of uplink repetition bundles comprises a plurality of transmission occasions, and
      receives a first transport block in uplink resources corresponding to at least a portion of an uplink repetition bundle of the periodic plurality of uplink repetition bundles; and
   a controller coupled to the transceiver, where the controller
      determines an indication, and
      transmits the indication,
   wherein the transceiver, receives a second transport block in a transmission occasion, where the second transport block includes different data from the first transport block, and where the transmission occasion is determined based on the indication and among the plurality of transmission occasions of the periodic plurality of uplink repetition bundles,
   wherein the transmission occasion comprises a second transmission occasion to transmit the second transport block,
   wherein the transmission of the first transport block is stopped at a first transmission occasion, where the first transmission occasion is before the second transmission occasion, and
   wherein reception of the second transport block is delayed until a next uplink repetition bundle based on a field in the indication.

2. The apparatus according to claim 1,
   wherein the plurality of transmission occasions of the periodic plurality of uplink repetition bundles comprises a first plurality of transmission occasions,
   wherein the uplink repetition bundle comprises a second plurality of transmission occasions, and
   wherein the indication indicates termination of transmission of the first transport block before
      a number of transmissions of the first transport block corresponding to the number of physical uplink shared channel repetitions has been reached, and
      a last transmission occasion of the second plurality of transmission occasions of the uplink repetition bundle.

3. The apparatus according to claim 1, wherein the indication comprises an indication indicating the first transport block has been successfully decoded.

4. The apparatus according to claim 1,
   wherein a HARQ process is associated with the first transport block, and
   wherein the indication indicates to transmit the second transport block for the HARQ process associated with the first transport block.

5. The apparatus according to claim 1,
   wherein the plurality of transmission occasions of the periodic plurality of uplink repetition bundles comprises a first plurality of transmission occasions,
   wherein the uplink repetition bundle comprises a second plurality of transmission occasions, wherein initial reception of the second transport block is delayed to the next uplink repetition bundle if the first transmission occasion is later than a given transmission occasion of a current uplink repetition bundle, and wherein the second plurality of transmission occasions of the uplink repetition bundle include the first transmission occasion and the given transmission occasion.

6. The apparatus according to claim 5, wherein the given transmission occasion is based on at least one selected from a higher layer indication and the number of physical uplink shared channel repetitions of the current repetition bundle.

7. The apparatus according to claim 1, wherein the first transport block and the second transport block are associated with a same HARQ process.

8. The apparatus according to claim 1, wherein the second transmission occasion is associated with a redundancy version of zero.

9. A method at a network entity, the method comprising:
transmitting a configured-grant configuration that configures a periodic plurality of uplink repetition bundles with each uplink repetition bundle including a number of physical uplink shared channel repetitions, where the periodic plurality of uplink repetition bundles comprises a plurality of transmission occasions;
receiving a first transport block in uplink resources corresponding to at least a portion of an uplink repetition bundle of the periodic plurality of uplink repetition bundles;
determining an indication;
transmitting the indication; and
receiving a second transport block in a transmission occasion, where the second transport block includes different data from the first transport block, and where the transmission occasion is determined based on the indication and among the plurality of transmission occasions of the periodic plurality of uplink repetition bundles,
wherein the transmission occasion comprises a second transmission occasion to transmit the second transport block,
wherein the transmission of the first transport block is stopped at a first transmission occasion, where the first transmission occasion is before the second transmission occasion, and
wherein reception of the second transport block is delayed until a next uplink repetition bundle based on a field in the indication.

10. The method according to claim 9,
wherein the plurality of transmission occasions of the periodic plurality of uplink repetition bundles comprises a first plurality of transmission occasions,
wherein the uplink repetition bundle comprises a second plurality of transmission occasions, and
wherein the indication indicates termination of transmission of the first transport block before
a number of transmissions of the first transport block corresponding to the number of physical uplink shared channel repetitions has been reached, and
a last transmission occasion of the second plurality of transmission occasions of the uplink repetition bundle.

11. The method according to claim 9, wherein the indication comprises an indication indicating the first transport block has been successfully decoded.

12. The method according to claim 9,
wherein a HARQ process is associated with the first transport block, and
wherein the indication indicates to transmit the second transport block for the HARQ process associated with the first transport block.

13. The method according to claim 9,
wherein the plurality of transmission occasions of the periodic plurality of uplink repetition bundles comprises a first plurality of transmission occasions,
wherein the uplink repetition bundle comprises a second plurality of transmission occasions,
wherein initial reception of the second transport block is delayed to the next uplink repetition bundle if the first transmission occasion is later than a given transmission occasion of a current uplink repetition bundle, and
wherein the second plurality of transmission occasions of the uplink repetition bundle include the first transmission occasion and the given transmission occasion.

14. The method according to claim 13, wherein the given transmission occasion is based on at least one selected from a higher layer indication and the number of physical uplink shared channel repetitions of the current repetition bundle.

15. The method according to claim 9, wherein the first transport block and the second transport block are associated with a same HARQ process.

16. The method according to claim 9, wherein the second transmission occasion is associated with a redundancy version of zero.

* * * * *